United States Patent [19]
Harms et al.

[11] Patent Number: 4,816,743
[45] Date of Patent: Mar. 28, 1989

[54] METHOD AND APPARATUS FOR THE IDENTIFICATION OF OSCILLATORY PROPERTIES AS WELL AS FOR THE OPERATION OF A PIEZO-ELECTRIC TRANDUCER

[75] Inventors: Klaus-Christoph Harms; Friedrich Ruckenbauer, both of Graz, Austria

[73] Assignee: AVL Gesellschaft fur Verbrennungskraftmaschinen und Messtechnik m.b.H. Prof. Dr.Dr. h.c. Hans List, Austria

[21] Appl. No.: 136,096

[22] Filed: Dec. 21, 1987

[51] Int. Cl.$^4$ .............................................. G01R 29/22
[52] U.S. Cl. ........................................ 324/56; 310/316
[58] Field of Search ........................... 324/56; 310/316

[56] References Cited
U.S. PATENT DOCUMENTS 3,832,630 8/1974 Micol et al. ............................ 324/56
4,467,271 8/1984 Ruckenbauer et al. ............... 324/56

Primary Examiner—Reinhard J. Eisenzopf
Assistant Examiner—Maura K. Regan

[57] ABSTRACT

For the identification of the resonance characteristics of a piezo-electric transducer, an input signal having a variably selectable frequency is divided into two sub-signals of the same frequency to be tuned to one another, one of said sub-signals being independent of and the other thereof being dependent upon the electromechanical properties of a piezo-electric tranducer under test. A difference output signal is generated from the two sub-signals, this difference output signal being measured relative to a reference output signal derived from the input signal. The tuning of the two sub-signals in the measurement is undertaken constantly to zero and with a rated value actual value differential control of that part of the difference output signal lying in phase or, alternatively, 180° out of phase with the reference output signal. The remaining part of the difference output signal which is phase-shifted 90° relative to the reference output signal, is used as a measure of the resonance characteristic of the transducer.

17 Claims, 4 Drawing Sheets

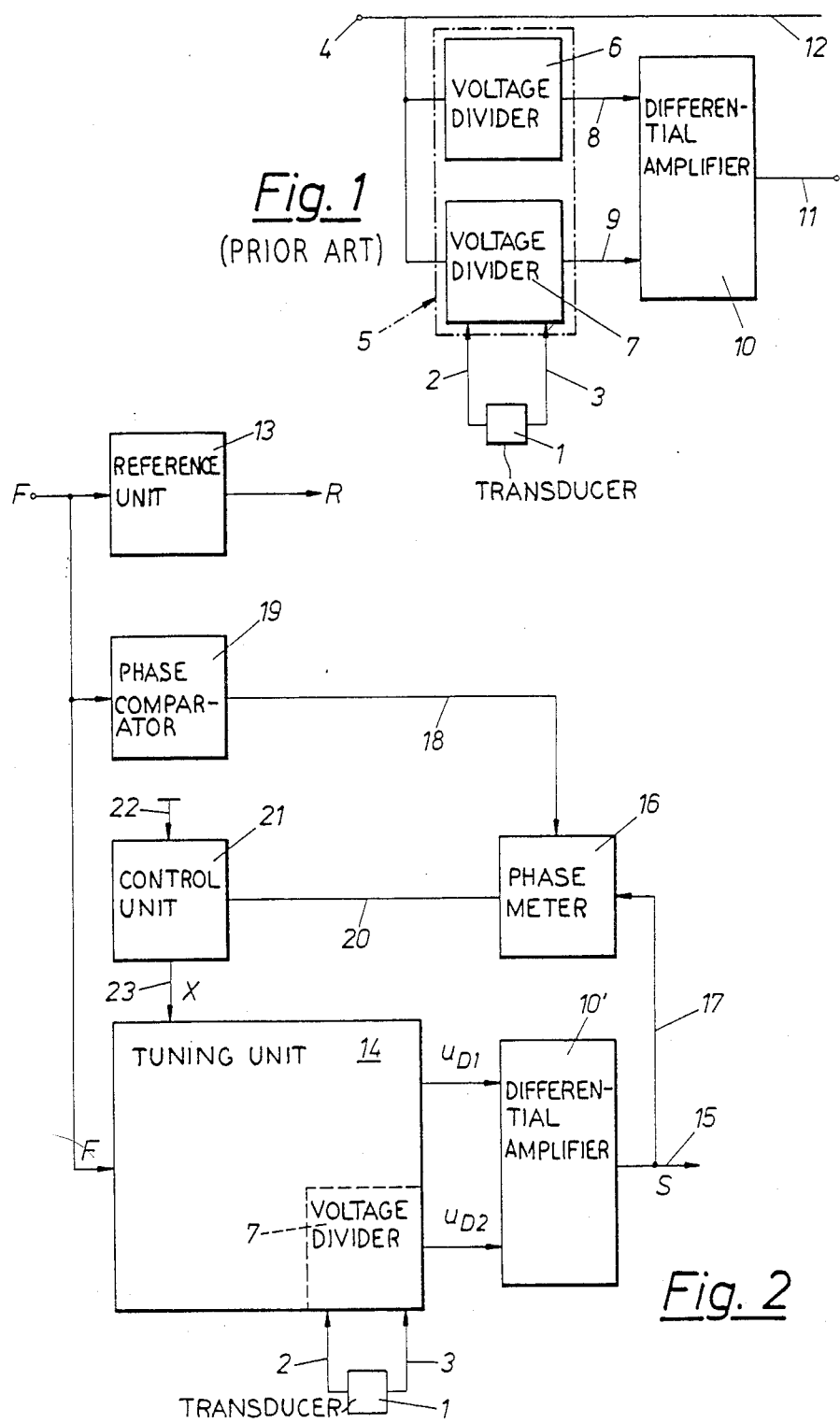

METHOD AND APPARATUS FOR THE IDENTIFICATION OF OSCILLATORY PROPERTIES AS WELL AS FOR THE OPERATION OF A PIEZO-ELECTRIC TRANDUCER

BACKGROUND OF THE INVENTION

1. Field of the Invention

The present invention pertains generally to piezoelectric transducers and, particularly, to a method and apparatus for detecting and identifying resonance characteristics of a piezo-electric transducer under test.

2. Description of the Related Art

For the purposes of this application, what is primarily meant by the term "piezo-electric transducers" is piezo-electric pressure sensors, for example, crystal pressure sensors, even though principles of the invention, may also apply to such other transducers such as accelerometers, microphones, hydrophones, piezo-electric final control elements, ultrasound transmitters, loud speakers, elements for typewriter keyboards, etc. The general term "oscillatory properties" is intended to cover the somewhat clearer term "resonance characteristics."

A piezo-electric transducer has oscillatory properties which are dependent upon the structure and nature of the transducer, whereby this dependency is so pronounced that influences of, for example, manufacturing tolerances may be recognized in a resonance characteristic given appropriate measurement and identification of such characteristic. Based upon a deviation of the resonance characteristic of a specific transducer from a reference characteristic prescribable for a series of such transducers, a quality control system can easily be set up for recognition of faulty transducers to thus separate them for further, more precise inspection. Furthermore, knowledge of a resonance characteristic is of great significance for avoiding measuring errors, since, resonance step-up occurs given an excitation of a transducer in the proximity of one of its resonant frequencies and the sensitivity, or, relationship of output signal amplitude to input signal amplitude of a transducer, deviates from an otherwise constant value at this frequency. Changes in the transducer due to, for example, aging, wear or damage can also be noticed in the resonance characteristics. Therefore, information of a type of change can be obtained from a comparison of a current measurement of the transducer resonance characteristics to earlier, stored measurements. As an example, high dynamic transducers may be developed, whereby the resonance characteristic offers a good basis for the evaluation of improvements in the suppression of undesired, low frequency resonances.

However, the resonance characteristics of transducers are determined not only by the transducer itself but also by its acoustically coupled environment. The degree of the coupling, the acoustical properties and the oscillatory modes of the environment are expressed in the measured resonance characteristic and, accordingly, can be recognized from a comparison of same with the resonance characteristic of a free, acoustically uncoupled transducer. Similarly, the, frequently very pronounced, influence of a coupling medium, for example, air or oil, can also be identified from a resonance characteristic.

Measuring methods or apparatus for the identification of oscillatory properties of a piezo-electric transducer, as described above, are known. Examples of such methods or apparatus are disclosed in Austrian patent 369,549. The basic idea is that first, an electronics insert, which can be denoted as a resonance detector module, is supplied with an input signal of a variably prescribable frequency via a frequency generator or synthesizer, and then, an electrical response appearing as a consequence of the piezo-electric properties of the transducer under test connected to this module is identified relative to a reference signal also based upon the input signal. Two subsignals are generated from the input signal, one being independent of the transducer under test and the other being dependent upon the electro-mechanical properties, actually determined at the time of measurement, of the connected transducer. For example, the sub-signals may be generated by using a voltage divider. The transducer under test is incorporated at a suitable location so that it influences one sub-signal, changing its characteristics. Insofar as the two sub-signals are essentially in phase, a difference output signal characterizing the reaction can be generated by a difference or subtraction function. Insofar as the two sub-signals are essentially 180° out of phase, a difference output signal characterizing the reaction of the transducer can be generated by a summing function.

Such measuring arrangements or apparatus are also used for testing or identification of the resonance characteristics of quartz resonators, which are presently being employed to an increasing extent, but which, however, differ quite considerably from what are referred to as piezo-electric transducers in various aspects. The frequencies at which piezo-electric transducers are operated usually lie in the range from 0 to an upper limit of about 400 or 500 kilohertz. In comparison, quartz resonators are usually operated at frequencies above 500 kilohertz. Furthermore, quartz resonators couple relatively far better to a quartz resonator test circuit than do piezo-electric transducers to a piezo-electric transducer test circuit because of differences in the electro-static capacitances of the two devices.

Piezo-electric transducers usually have great inert masses due to transmission members and the like but have only a slight active piezo-electric volume. The sum of the internal capacitance and cable capacitance for typical transducers lies on the order of perhaps 30 to 500 pF. In contrast, capacitance variations measured during the evaluation of the transducer, in the case of a capacitative resistance or bridge arrangement, lies on the order of magnitude of perhaps 10 to 500 fF, i.e., having a capacitance lower by about a factor of 1,000. The evaluation of the small capacitance variations makes particularly high demands of the measuring method or apparatus employed and as such can only be met to a limited degree with the prior art arrangements, given a reasonable outlay of circuits.

Thus, it is highly desirable to have a method and/or apparatus which can be used to identify the oscillatory properties of a piezo-electric transducer which does not require an unreasonable outlay of circuits, in spite of the unfavorable coupling characteristics of such transducers.

SUMMARY OF THE INVENTION

The present invention provides a method and apparatus for the identification of oscillatory properties of piezoelectric transducers, especially resonance characteristics, in which the precision and evidentiary force of the measurement are enhanced in spite of the poor coupling characteristics of the piezo-electric transducers. Moreover, the invention provides this without an unreasonable outlay for circuits.

The invention is directed to a measuring method for the identification of oscillatory properties of a piezo-electric transducer, wherein two sub-signals of the same frequency to be matched (or tuned) with one another are generated from an electrical input signal having a variably selectable frequency, one of said sub-signals being independent of and the other sub-signal being dependent upon the electro-mechanical properties of the transducer under investigation. A difference output signal is generated by the sub-signals after they have been subjected to a difference or, alternatively, summation function, said difference output signal being measured relative to a reference output signal also generated from the input signal.

The invention is further directed to an apparatus for the identification of oscillatory properties of a piezo-electric transducer, comprising a signal generator which supplies an electrical signal having a variably selectable frequency to a tuning unit that generates two sub-signals of identical frequency to be matched (or tuned) to one another from the input signal. One of said sub-signals is such that it is independent of the electro-mechanical properties of the transducer under test while the other sub-signal is such that it is dependent upon the electro-mechanical properties of the transducer under test via a coupling of transducer to a tuning unit. The apparatus further comprises a difference function unit in communication therewith which generates a difference output signal from the two sub-signals and a reference unit which is also in communication with the signal generator and which generates a reference output signal from the input signal as well as an evaluation unit which is connected to the difference function unit and to the reference unit.

Additionally, the unit is directed to a method for the operation of a piezo-electric transducer at one of its resonant frequencies, whereby the transducer is supplied with an electrical drive signal having a controllable frequency.

It is thus an object of the present invention to specify a measuring method as well as an apparatus for the identification of oscillatory properties and, in particular, for the identification of the resonance characteristic of a piezoelectric transducer with which the disadvantages noted above can be avoided, and whereby the precision and the evidentiary forces of the measurements of such characteristics are enhanced in a simple way A further obejct of the present invention is to specify a method for the operation of a piezo-electric transducer at one of its resonance frequencies, wherey the transducer is supplied with an electrical drive signal having a controllable frequency, and whereby the difficulties that arise from the poor coupling and from the unfavorable relationship of the relatively greater load capacitance of the equivalent circuit diagram of the transduoer and the extremely low effective capacitance are eliminated in a simple and cost beneficial way.

In a measuring method for the identification of oscillatory properties of a piezo-electric transducer, the stated objects are achieved in accordance with principles of the invention in that the tuning (or matching) of two sub-signals used in the measurement is undertaken to zero constantly and with a rated-actual value control of that part of the difference signal line in phase or, alternatively, 180° out of phase with the reference output signal; and in that the remaining part of the difference output signal which is phase shifted essentially by 90° relative to the reference output signal serves as a measure of the resonance characteristic of the transducer.

In an embodiment of the measuring method, consistent use is made of physical relationships in oscillatory systems. When a piezo-electric transducer, which necessarily represents an oscillatory system, is excited (via an input signal) to mechanical or acoustic oscillations, then the transducer, or specifically, the piezo-electrical transducer element, generates an electrical charge signal having an excitation frequency due to a direct piezo-effect which is proportional to deformation of the piezo-electric transducer element. When the excitation frequency lies in proximity to one of the resonance frequencies of the transducer, resonance step-up occurs, meaning that the sensitivity (usually referring to the output signal amplitude to input signal amplitude relationship characteristic of the transducer) deviates at this frequency from an otherwise constant value. This deviation includes both amplitude and phase deviations, i.e., deviations from the constant ensue not only in the amplitude relationship of output signal to input signal but also in the phase relationship of the two signals relative to one another. What is then to be understood as the transducer sensitivity in a narrower sense is the amount of the complex-valiant sensitivity function. When the amount of the sensitivity deviates from an otherwise constant value due to the resonance step-up, then this resonance likewise appears in a representation of the real part of the function as a more or less great deviation from the constant part of the sensitivity. However, the resonance appears in the representation of the imaginary part of the function as a deviation from zero and therefore appears with extreme clarity.

The imaginary part of the difference output signal or, specifically, that part of the difference output signal lying at quadrature (90° phase shifted) relative to the reference output signal, characterizes the dissipative part of the sensitivity function which is proportional to the mean energy loss per oscillatory cycle. Given input frequencies far from a resonance frequency of the transducer, the losses and, thus, the dissipative part of the sensitivity function, become disappearingly small in comparison to the maximums of the dissipated power that appear at the resonance frequencies.

An explanation for the nearly complete correspondence of the measured resonance characteristic to the dissipative part of the sensitivity function is that practically no electrical losses occur. Although the electro-mechanical coupling is relatively slight, the dialectic losses are negligible. Furthermore, the electrical output signal can be measured in nearly powerless fashion with modern electronic components. The losses which occur are thus nearly exclusively generated by the attenuation of the mechanical oscillations.

The relationships beteween the said, complex sensitivity function and the actual resonance characteristic can be made even clearer on the basis of the following comments regarding the physical units used in this context. The sensitivity of a piezo-electric pressure sensor is recited in pC/bar, the piezo-electric pressure sensor generating a defined, electrical charge quantity measured in pC due to the piezo-effect given in an acting pressure of one bar. The resonance characteristic of this pressure sensor is recited in fC/V because it generates a defined electrical charge quantity measured in fC due to the piezo-electric reaction given an acting, electrical excitation signal of one volt. Accordingly, the conversion factor for a transducer with which the measured resonance characteristics may be converted into a corresponding spectrum of the pressure sensitivity is measured in kv/bar. This conversion factor is constant for low frequencies and takes into consideration the piezo-electric and dielectric constants active in the transducer as well as various geometric factors such as effective membrane area, electrode area and the thickness of the piezo-electric lamina. Deviations from the low frequency value occur at higher frequencies, these being caused by the fact that the mechanical oscillations which are responsible for the resonances are excited at various locations in the transducer. In the present case, excitation occurs in the piezo-electric transducer element, as opposed to at the membrane, as is the case with a crystal pressure sensor. The frequency up to which a constant conversion factor may be used increases with a decrease in the shorter the distance between the two locations of excitation.

The part of the difference signal that is proportional to the real part of the complex-valiant sensitivity function lying in phase or alternatively, 180° out of phase with the reference output signal is not directly required for the identification of the resonance characteristic given the measuring method taught by the invention; rather, it is used for tuning the two sub-signals in a measurement. The actual value of this part of the difference output signal is compared to a rated value, zero, whereupon the tuning relationship is altered correspondingly given a deviation from the rated value.

It may be understood from the remarks presented above that the phase relationships of a reference output signal and the difference output signal are critical for the implementation of a measuring method in accordance with the invention. What is not critical, is the location at which the reference output signal is derived from the input signal, what phase relationship there is between the reference output signal and the input signal and whether electronic components employed for voltage dividers or potential filters or the like are phase rotating or not, as long as it is merely assured that the phase relationship between the reference output signal and the difference output signal exists at the branching of the signal representing the actual value for control of the tuning. Thus, one can proceed with a capacitive voltage divider which does not cause any phase shifting and with a reference output signal which is in phase with the input signal. However, the employment of voltage dividers containing RC elements which are phase shifting is also conceivable. When such is the case and the reference output signal is not adapted with respect to its phase relationship, then a rated value for the amplitude control would generally have to be other than zero. It is necessary in any case that the output of a differential amplifier forming the difference function which is applied to the sub-signals is only dependent on the imaginary part of the transducer capacitance in an optimally good approximation and that the influence that the real part of the transducer capacitance has on the difference output signal disappears. A modification of the rated value to a value unequal to zero is equivalent, in this context, to the consideration of a different phase reference, which is required anyway for the identification of the amplitude of the difference output signal to the phase of the reference output signal.

An apparatus for the identification of oscillatory properties of a piezo-electric transducer which has already been set forth at the outset of the summary is fashioned in accordance with the invention such that a tuning unit is connected to an automatic control unit which supplies a manipulated variable to the tuning unit for adjustment of the tuning relationship in response to a comparison of the actual value of that part of the difference output signal from the difference function unit lying in phase or alternatively 180° out of phase with the reference output signal from the reference unit to the rated value. This automatic control unit is thus essentially provided only with an input of the actual value of that part of the output of the difference forming unit lying in phase or alternatively 180° out of phase with the reference output signal and with an output for the corresponding manipulated variable for follow-up of the tuning unit.

It is also an advantage of the invention that a method for operating of a piezo-electric transducer at one of its resonance frequencies may be derived therefrom which exploits the above-described principle of controlling the tuning of the two sub-signals in a simple way. The method already described at the outset of this summary, is fashioned in accordance with the invention such that two sub-signals of the same frequency to be matched (or tuned) to one another are generated from a drive signal, one of said sub-signals being independent of and the other sub-signal being dependent upon the electromechanical properties of a transducer under test. A difference output signal is generated from a difference function or, alternatively, a sum function, this difference output signal being measured relative to (or compared to) a reference output signal also generated from the drive signal. Furthermore, the matching (or tuning) of the two sub-signals during operation is undertaken continuously and with a rated-actual value control of the part of a difference output signal lying in phase or, alternatively, 180° out of phase with the reference output signal, driven to zero. The remaining part of the difference output signal is identified and is continuously maximized by means of control of the frequency of the drive signal.

Essentially, the signal generator of the above-described measuring means may be replaced by a VCO (voltage control oscillator) and the imaginary part of the transducer capacitance generates the required manipulated variable for this VCO via a maximum controller, so that the frequency of the VCO is set such that the output signal is always at a maximum. One frequency, namely the resonance frequency of the transducer, is thus held at the VCO.

In order to filter out one specific resonance frequency from many resonance frequencies, a suitable filter merely has to be inserted at some location. The resonance frequency, or alternatively, a desired resonance frequency of the transducer, can thus be retained in a simple way in order to, for example, identify the change thereof dependent upon pressure, temperature or other influencing physical quantities. Therefore, despite low coupling and relatively high cable and internal capacitances, an actively operating oscillator is realized which would otherwise be realizable only with relatively great circuit outlay.

In a further embodiment, a measuring method in accordance with the invention provides that both sub-signals can be modified for tuning, preferably such that a sum of the signals is constant; and further such that the reference output signal is generated from one of the two tuned subsignals and is measured with respect to its amplitudes; and that the tuning relationship is identified from the relationship of this amplitude to the amplitude of the input signal and is used for the numerical interpretation of the measured result. Both sub-signals are modified such that this modification obeys a specific equation, for example, where the sum of the sub-signals is constant, whereby one can draw conclusions about the two signal quantities and, thus, about the tuning relationship given a derivation of the reference output signal from one of the two sub-signals already tuned.

Without knowledge of the tuning relationship, the measured amplitude of the difference output signal could not directly be converted into the desired measure of the resonance characteristic which should be independent of the amplitude of the excitation signal and independent of the size of the real part of the transducer capacitance. Conversely, the tuning relationship can be identified from knowledge of the amplitude of the input signal and of the measured amplitude of one of the two sub-signals with reference to a conditional equation, for example, Where the sum of the sub-signals is constant and proportional to the input amplitude. With this information and from knowledge of the reference element effecting the division of the input signal into the two sub-signals as well as the division ratio therein, the real part of the transducer capacitance can be identified and can be used for converting the amplitude of the difference output signal into the desired measure of the resonance characteristic.

In another embodiment, the invention provides that only the part of the difference output signal which is phase shifted 90° relative to the reference output signal is measured during measurement of the remaining difference output signal. This means that a demodulation onto the imaginary part ensues again in the evaluation although, theoretically, only the imaginary part actually remains. Unwanted signals and noise in the measured signal can thereby be reduced.

The measurement of the remaining difference output signal is undertaken within a narrow band at the frequency of the input signal. This also suppresses unwanted signals which arise from powerline hum and noise.

An apparatus for identifying oscillatory properties of a piezo-electric transducer is further improved in accordance with the invention such that a control unit for supplying an actual value, which serves for control, is connected to a phase meter, preferably a synchronous demodulator, which is in turn in communication with the difference function unit, which supplies the difference output signal. Since the output of the difference function unit is nearly zero and is therefore highly noise infested, the risk of a malfunction or mismeasurement is present given a standard phase meter. In order to still be able to filter out a phase relation even from an extremely noisy signal, one must measure in an extremely narrow band fashion. This filtering also occurs within the synchronous demodulator, whereby the measuring precision and reliability can be increased in a simple way.

Furthermore, the invention provides that the control unit is essentially formed by a floating action controller which preferably also comprises proportional and/or differential portions for increasing its stability and speed, where, with the leveling effect, no deviation between the actual and rated values occurs.

The invention provides still further that the tuning unit can contain a capacitance diode connected to the controlling unit, this capacitance diode acting as the actual tuning element and having a capacitance which is variable via a manipulated quantity. Tuning via a single, cost beneficial element is thus possible in a simple way. Similar advantages arise when a field effect transistor connected to the control unit is provided as the actual tuning element, its drain-source resistance being variable via a manipulated quantity. In both cases, voltage-controlled amplifiers or attenuators are constructed with these components, these components varying a signal amplitude in accordance with an applied control voltage.

In another development of the invention it is provided that the tuning unit contains a slope amplifier connected to the control unit as the actual tuning element, the gain thereof being variable via the manipulated quantity. Since such a component is commercially available as an integrated module, a simple and economical embodiment of the tuning unit is thus enabled.

In accordance with another development of the invention, however, the actual tuning element of the tuning unit may include a differential amplifier comprising two emitter-coupled transistors connected to the control unit, whereby the manipulated variable acts on the division of a current signal generated from the input signal into the emitter currents of the two transistors of the differential amplifier, which emitter currents correspond to the two sub-signals. This is also a simple manner for realizing the tuning of the two sub-signals to be supplied to the difference function unit.

In order to improve control behavior, the manipulated variable, can also be logarithmized, a logarithm unit being inserted between the control unit and the tuning unit. Differential amplifiers usually have a logarithmic characteristic and the high level signal behavior can be opposed by a linearization in an extremely simple way.

In combination with the tuning, utilizing the differential amplifier mentioned above the invention provides in an especially preferred further development that a second differential amplifier comprising two emitter-coupled transistors are connected in parallel in the tuning unit to the first differential amplifier. The second differential amplifier serves as a current divider, whereby a constant current which corresponds to the mean quiescent current of the current signal generated from the input signal is divided into two further sub-currents in the same relationship present in the first differential amplifier. These two further sub-currents are each additively combined with one of the two sub-currents of the first differential amplifier into two resulting sub-currents so that the mean quiescent currents of the resulting two sub-currents are essentially independent of a modification of the ratio of the current division caused by the control unit.

A manner for compensating hunting is established in a simple way with this second differential amplifier, this hunting otherwise occurring in the output signal with the full gain of the differential amplifier. Both outputs of the tuning units are in phase with the input signal which is converted into a current signal. However, these two outputs are 180° out of phase with huntings which act on the manipulated variable. The difference of the in phase signals is driven to zero in the difference function unit; the difference of the out of phase signals however, is increased in the same way. A suppression of these huntings can thus be undertaken with said elements or measures.

The output of the difference function unit as well as the output of the reference unit can be followed by frequency band pass filters attuned to one another. This in turn leads to a suppression of noise signals, and, thus, to an increase in measurement precision.

It should also be pointed out that the phase relations noted above only actually apply to ideal components or circuit structures and that tuning elements can be provided at suitable locations for the correction of the actually occuring slight phase or shifting arising from signal transit times and stray capacitances.

The objects and aspects mentioned above as well as others will become more apparent by reference to the drawings and to the description of the preferred embodiments.

BRIEF DESCRIPTION OF THE DRAWINGS

FIG. 1 is a block diagram of an arrangement of the prior art for identifying piezo-electric transducer oscillatory properties.

FIG. 2 is a block diagram of an arrangement of an apparatus for identifying oscillating properties of piezo-electric transducers in accordance with principles of the invention.

DESCRIPTION OF THE PREFERRED EMBODIMENT

Figure 3:
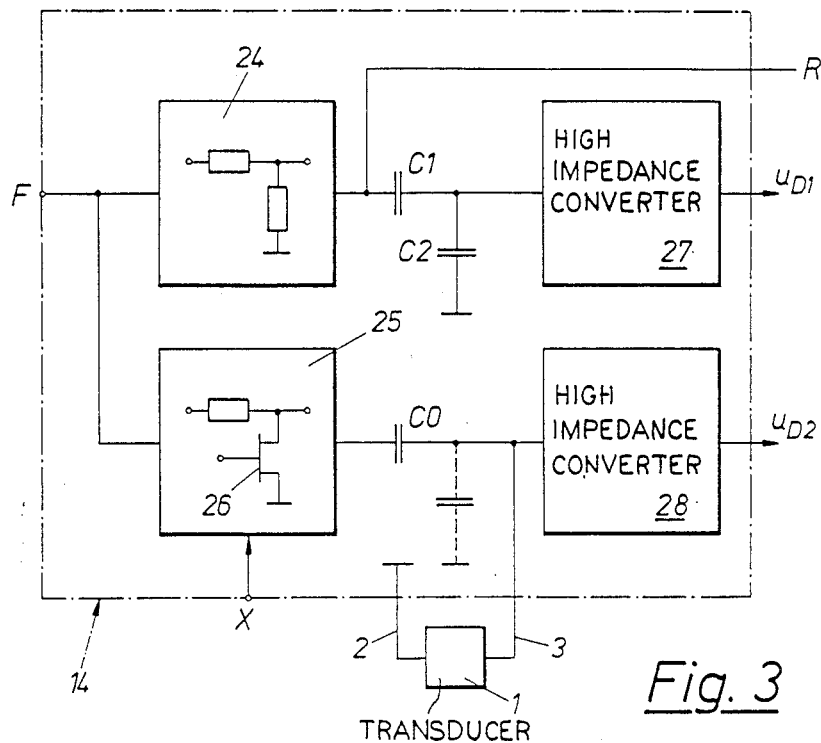
FIG. 3 is a block diagram of an apparatus including a tuning unit embodying principles of the invention for use with the arrangement of FIG. 2.

An apparatus illustrated in block diagram form in FIG. 1 is used for the identification of oscillatory properties and, in particular, of the resonance characteristic of a piezo-electric transducer 1 which can be coupled via leads 2 and 3 to the apparatus. A signal generator (not shown) provides an electrical input signal at lead 4 having a variably selectable frequency. Sub-signals of the same frequency to be tuned to one another are generated at leads 8 and 9 from this input signal via two voltage dividers 6 and 7 which are combined in a tuning unit 5. The sub-signal of the upper voltage divider 6 in FIG. 1 is independent of the transducer 1. The sub-signal of the lower voltage divider 7 is dependent on the electro-mechanical properties of the transducer 1 because of the coupling of the transducer to the unit 5 or, specifically, to the voltage divider 7. The two sub-signals are supplied to a differential amplifier 10 via leads 8 and 9 whose output at lead 11 is in communication with an evaluation unit (not shown).

A reference unit (not shown) which is in communication with the signal generator generating the input signal at lead 4, generates a reference output signal from the input signal and, just like the output at 11, is connected to the evaluation unit via a lead 12.

A difference output signal is generated at lead 11 by a difference (or subtraction) function in the differential amplifier 10 to which the two sub-signals supplied by the voltage dividers 6 and 7 are subjected. This difference output signal is measured in the evaluation unit relative to the reference output signal. On the basis of an appropriate tuning of the two voltage dividers 6 and 7, this being undertaken in the prior art in the form of a balancing before the measuring, what is achieved, within certain limits, is that the difference output signal available at lead 11 or, specifically, the measured signal already compared to the reference outlet signal, represents only the reaction of the piezo-electric transducer 1 under test to excitation by input signal at lead 4.

Instead of the differential amplifier 10, a summing amplifier can be employed in this known embodiment insofar as a phase shifting by 180° is produced in only one of the paths of the two sub signals. Such a substitution would be obvious to those in the art.

An apparatus for the identification of the resonance characteristic of a piezo-electric transducer 1 in accordance with principles of the invention is shown in FIG. 2 and is also provided with a signal generator (not shown) which supplies an electrical input signal F having a selectable frequency. A reference output signal R is generated from this input signal F by a reference unit 13, this reference output signal R being again supplied to an evaluation unit (not shown). The input signal F is supplied to a tuning unit 14 which generates two sub-signals $U_{D1}$ and $U_{D2}$ of the same frequency and which are to be tuned to one another. The sub-signal $U_{D1}$ is independent of the piezo-electric transducer 1. The sub-signal $U_{D2}$ is dependent upon electro-mechanical properties and, in particular, upon the resonance characterstic, of the transducer 1 via the leads 2 and 3 connected to the voltage divider 7, illustrated by broken leads. From the two sub-signals $U_{D1}$ and $U_{D2}$, a difference (or subtraction) function unit 10', fashioned as a differential amplifier or, alternatively, as a summing amplifier - given sub-signals phase offset by 180°, generates a difference output signal S at leads 15 and 17, which, just like the reference output signal R, is supplied via output lead 15 to an evaluation unit (not shown).

A phase meter 16 fashioned as a synchronous demodulator is supplied with the difference output signal S via a lead 17 and is also coupled, via a lead 18, to a unit 19 for generating a phase reference signal at lead 20 from the input signal F. Via the synchronous demodulator 16, that part of the difference output signal S from the difference (or subtraction) function unit 10' lead in phase or, alternatively, 180° out of phase, with the reference output signal R of the reference unit 13 is selected from the signal S and is supplied via a lead 20 to a control unit 21 as an actual value. A rated value - here, for example, zero - can be prescribed at the control unit 21 via an input 22, this rated value is then utilized in the control unit 4 for comparison with the actual value. Deviations between the rated value and the actual value influence a manipulated variable X which is supplied to the tuning unit 14 via a lead 23 and which serves to modify the tuning or, specifically, to modify the division of the input signal into the two sub-signals $U_{D1}$ and $U_{D2}$.

What is achieved by the above-described constant follow-up on the ratio of the actual value to the rated value, is that only a signal proportional to the imaginary part of the complex sensitivity function, which, as described, characterizes the reaction of the piezo-transducer 1 and, thus, its resonance characteristic, remains at the evaluation unit. This allows extremely precise measurements in a simple way.

In FIG. 3 there is shown an embodiment of the tuning unit 14 in greater detail. Input signal F is divided into the sub-signals which proceed on separate paths to the two assemblies 24 and 25 for control of the amplitude relationships of the two sub-signals. As shown in FIG. 3 the assemblies 24 and 25 comprise ohmic voltage dividers. Assembly 25 includes a variable resistance which comprises a field effect transistor 26 whose drain to source resistance is varied by the manipulated variable X. Down line from the assemblies 24 and 25 are capacitated voltage dividers C1, C2 and C0, having a capacitance equal to that of the transducer 1 and of the leads 2 and 3. Additional matching capacitors may be added as needed. The two sub-signals $U_{D1}$ and $U_{D2}$, finally, are supplied to the difference (or subtraction) function unit (not shown) via high-resistance impedance converters 27 and 28.

Further in FIG. 3, it is shown that the reference output signal R is branched off from the output of assembly 24. No phase shifting occurs in the following capacitive voltage divider comprising capacitors C1 and C2. Except for the effect of the piezo-electric reaction, the sub-signals $U_{D1}$ and $U_{D2}$ have the same phase relation due to the symmetry of both branches. This phase relation is also preserved in the reference output signal R by branching off said reference output signal as described above or, in equivalent fashion, by branching off said signal at the output of assembly 25. At any rate, it is guaranteed that, given appropriate tuning of the two sub-signals, the signal amplitude of the difference output signal S measured in relation to the reference output signal R in fact only represents the only piezo-electric reaction of the transducer Instead of having the tuner control of FIG. 3 acting only upon one of the two sub-signal paths, a tuning of both sub-signals can also be undertaken such that a sum of the sub-signals meets a specific function, such function preferably being a constant. An appropriate fashioning of the tuning control to accomplish the foregoing is shown in FIG. 4.

Figure 4:
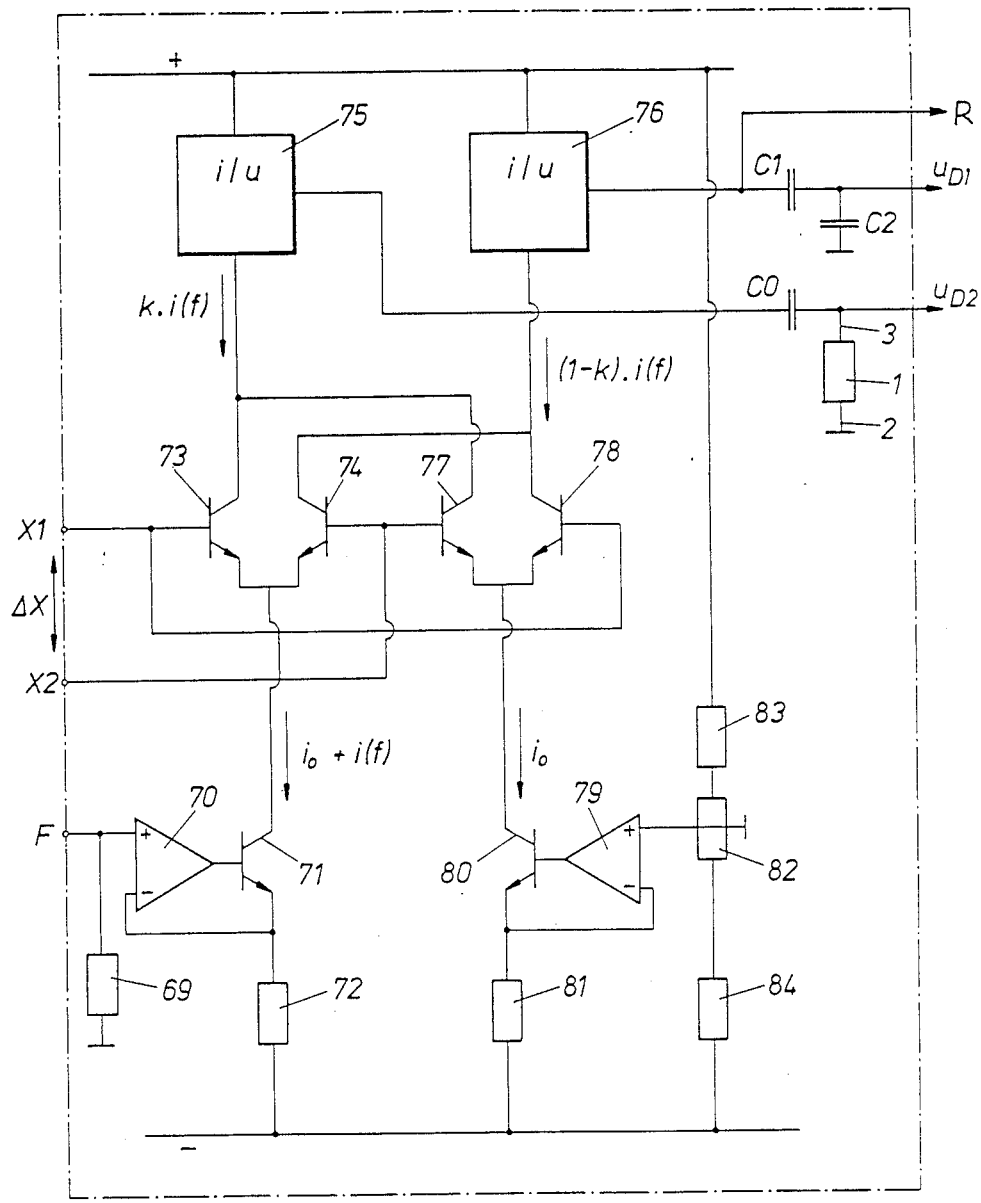
FIG. 4 is a block diagram of another embodiment of the invention.

As shown in FIG. 4, the input signal F is referred to ground via a terminating impedance 69 and is converted into a current signal via a precision current source formed of an operational amplifier 70, a transistor 71 and an emitter resistor 72 in a manner known in the current source art. A current signal formed from the current signal F contains a dc component $i_o$ and a frequency dependent current component $i(f)$. This current is drawn from a differential amplifier composed of two emitter-coupled transistors 73 and 74. The two emitter currents of these two transistors 73 and 74 must, as a sum, yield the current signal $i_o + i(f)$. The division of this sum current ensues dependent upon the applied manipulated variable voltage X or, X1 −X2 or, alternatively, X2−X1. The two sub-currents appear at collectors of the two transistors 73 and 74, these two sub-currents being converted by voltage current transformers 75 and 76, respectively, into signal voltages which are applied to the capacitated voltage dividers (capacitors C1 and C2) in the reference branch and capacitor C0 and transducer 1 in the measuring branch. The output sub-signals $U_{D1}$ and $U_{D2}$ are thus formed. An auxillary means is required to compensate for huntings of the manipulated variable X. Huntings of X have an anti-phase (i.e., 180° out of phase) effect on the output sub-signals $U_{D1}$ and $U_{D2}$ since they are amplified 180° out of phase by the differential amplifier formed by the transistors 73 and 74. By contrast, the input signal has an in phase effect on the sub-signals $U_{D1}$ and $U_{D2}$, thus raising the problem that the difference or subtraction function causes the frequency signal to almost disappear except for the piezo-electro reaction of the transducer but amplifies the huntings of X with high gain, thus requiring some sort of compensation means.

The compensation means or auxillary means provided to compensation for huntings of X comprises two transistors 77 and 78 which, like the transistors 73 and 74, are emitter-coupled, i.e., they form a difference in transistor pair, and which are driven in the same way by the quantities X1 and X2, i.e., by the manipulated variable X. The mean quiescent current of the current $i_o + i(f)$, i.e., $i_o$ is formed by utilizing a precision current source comprised of an operational amplifier 79, of a transistor 80 and of an emitter resister 81 by a manner known in the current source art. This quiescent $i_o$ is divided in accordance with the same division ratio as the signal current $i_o$ $i_o(f)$ and the two sub-currents of $i$ are added to the sub-currents of $i_o + i(f)$ such that a compensation of the division ratio of $i_o$ occurs. The result is that the current to voltage transformers 75 and 76 now only receive a quiescent current $i_o$ independent of the tuning relationship and receive a signal current $i(f)$ influenced by a tuning relationship K so that the output sub-signals $U_{D1}$ and $U_{D2}$ formed by the current to voltage transformers no longer contain any huntings from the quiescent current $i_o$.

The precision curent source for setting the compensation quiescent current is set with a voltge regulator comprising a potentiometer 82. This voltage regulation is optimized by including drop resistors 83 and 84 in series with the potentiometer 82. A voltage that is converted into the current $i_o$ is set, so that a precise balancing of the hunting suppression occurs.

The entire tuning unit 14 shown in FIG. 4, is supplied with a positive supply voltage and a negative supply voltage because the frequency input signal F is referred to as ground as described above.

Figure 5:
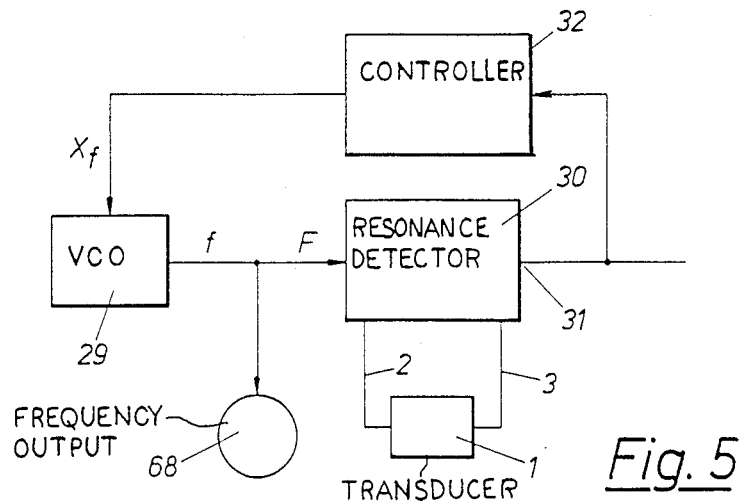
FIG. 5 is a block diagram of an apparatus for operating a piezo-electric transducer in accordance with principles of the nvention.

In FIG. 5 there is shown in flow schematic form an apparatus for operating a piezo-electric transducer at one of its resonant frequenies in accordance with principles of the invention. A voltage controlled oscillator (VCO) 29 supplies an electrical drive signal u having a controllable frequency which can be measured at frequency output 68. As input signal F, the drive signal f is input into a resonance detector 30 which, for example, constitutes an arrangement similar to that of FIG. 2, but additionally comprises the evaluation unit not shown in FIG. 2. A measured signal at output 31 at the resonance detector 30 represents the resonance characteristic of the transducer 1 which is connected via leads 2 and 3 to the resonance detector 30. The output at 31 is supplied to a maximum controller 32 which follows up the frequency of the voltage controlled oscillator 29 providing a feedback control signal f in a manner which is not relevant to this disclosure. The maximum controller 32 follows up the frequency of VCO 29 such that the transducer 1 is actually operated at one of its resonant frequencies.

In order to capture a specific resonant frequency of the transducer 1, a filter unit (not shown) or the like can also be provided. The function of the resonance detector 30 has already been described in detail with regard to arrangement of FIG. 2 and thus will not be discussed further in order to avoid repetition.

As should now be apparent to those skilled in the art the arrangement of FIG. 5 allows the construction of an oscillator with extremely simple means which would otherwise be difficult given the slight couplings which normally occur and given the relatively great cable and internal capacitances of the piezo-electric transducers.

Figure 6:
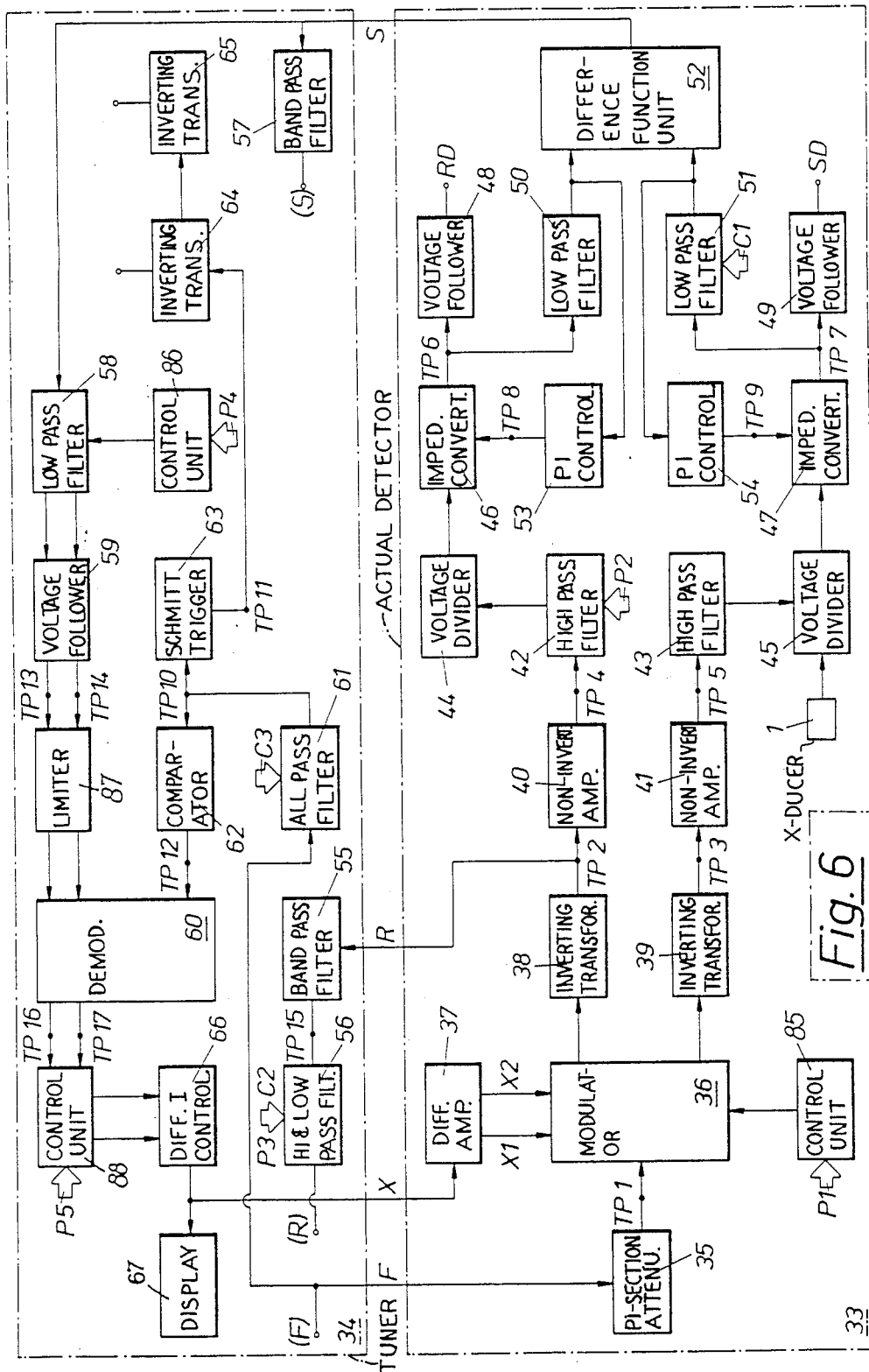
FIG. 6 is a detailed block diagram of an apparatus in accordance with the arrangement of FIG. 2.

Illustrated in FIG. 6 is an arrangement which essentially corresponds to the arrangment of FIG. 2, but which includes more detail regarding the circuit structure shown therein.

As is shown, the circuit of FIG. 6 comprises two motherboards, an actual detector 33 and a tuner 34. The detector 33 contains a 50 ohm termination for the sinusoidal signal input signal F of the signal generator (not shown) in the form of a pi-section attenuator 35. The input signal is then transmitted to a modulator over a rod designated as TP1 (test point 1). The generation and tuning of the sub-signals for the measuring channel and for the reference channel ensues with the utilization of a modulator 36 as described in connection with the description of arrangement of FIG. 4. The control signal, or, specifically, the manipulative variable X is logarithmized by two diodes in a differential amplifier S7 in order to obtain a leadarized characteristic of the tuner control. Suppression of huntings of the control signal X can thereby be set via a control unit 85 by adjusting a potentiometer Pl coupled thereto.

Two current signals at two outputs of the modulator 36 are amplified in parallel in two discretely constructed inverting voltage transformers 38 and 39 and in two similarly discretely constructed non-inverting amplifiers 40 and 41. The line comprising current-voltage transformer 38 and amplifier 40 is designated the reference channel. The line comprising current-voltage transformer 39 and amplifier 41 is designated the measurement channel. These signals are then supplied in parallel to two high pass filters 42 and 43, respectively. Any phase differences between the signals output by the non-inverting voltage amplifiers 40 and 41 in the low frequency range may be tuned to zero with a potentiometer P2 coupled to high pas filter 42.

A capacitative voltage divider 44 of the reference channel is constructed with two 100 pF capacitors. A capacitator voltage divider 45 of the measurement channel comprises a 100 pF reference capacitor and the transducer 1 (plus plug and cable) which, for example, is connected via a 10 nF capacitor. The two voltage signals at the outputs of voltage dividers 44 and 45 are tapped nearly power free and in extremely high impedance fashion by two discretely constructed impedance converters 46 and 47 operating on the bootstrap principle. Voltage followers 48 and 49 comprising two operational amplifier decouple auxillary outputs RD (reference drive) and SD (signal drive), respectively.

The two signals RD and SD are supplied to the difference function unit 52 via two passive low-pass filters 50 and 51. Any phase difference between the reference channel and the measurement channel signals and the radio frequency range may be tuned to zero by adjusting trimming capacitor C1 in the measurement channel.

Two operational amplifiers wired as PI controllers 53 and 54 serve the purpose of setting the DC operating points for the two impedance converters 46 and 47, respectively. The mean voltage value at the input of the difference function unit 52 is thereby compared with zero and any deviation is used to generate an offset voltage which acts on inputs to the impedance converters 46 and 47 via bootstrap resistors.

The difference function unit 52 comprises, for example, an integrated differential amplifier generating a differential output and an operational amplifier wired as a subtractor whose output signal S is supplied to the second motherboard 34.

Reference signal R is branched off from the reference channel at the point of the TP2 and is supplied to the second motherboard 34 at band pass filter 55. Reference output R is freed of hum and noise signals by the band pass filter 55 which comprises a fourth order band pass filter. Band pass filter 55 comprises an operational amplifier utilized as a voltage follower. A filter 56 which is made of a high pass filter comprising a potentiometer P3 and a low pass filter comprising a trimming capacitor C2, serves to exactly set the phase relation of the reference signal relative to the difference output signal S.

In a manner similar to that employed for reference output signal R, the difference output signal S is partially freed of hum and noise signals in an active fourth order band pass filter 58 and is supplied to the output via a low pass filter (not shown). Signal S is supplied to a demodulator 60 via a low pass filter 58 and FET voltage follower 59, functioning as a DC level converter, and via a limiter 86. Fine tuning of the DC operating point and, thus, suppression of the phase reference signal at point TP12 is set by adjusting potentiometer P4 at a control unit 86.

The phase reference signal is derived from sinusoidal input signal F of the signal generator. The trimming capacitor C3 serves the purpose of setting the phase shift with an all pass filter 61 which, for example, may comprise an operational amplifier. The phase reference signal is generated from the sinusoidal signal with a phase relation suitably set to the difference output signal S, being generated through a comparator 62 which, for example, may be comprised of an operational amplifier including negative feedback diodes.

Furthermore, the input signal F is taken at test point TP10 and is supplied via a passive low pass filter (not shown) to an inverting Schmitt trigger 63 comprising, for example, an operational amplifier. When a negative DC voltage is superimposed on input signal F, then the output at TP11 of the Schmitt trigger becomes positive and vice versa. The digital signal at test point TP11 is supplied to two inverting transistor stages 64 and 65 whose outputs are available for control of displays or the like.

The DC voltage differential between the two differential outputs at TP16 and TP17 of the demodulator 60 is set by adjusting a potentiometer P5 coupled to a control unit 88. This voltage differential is freed of frequency components by a low pass filter (not shown) and is supplied to a differential current controller 66 which, for example, comprises an operational amplifier. An output signal of this controller 66 is supplied to the tuning unit of the detector 33 as the manipulated variable X.

An "out of range" display 67 is included and for which two oppositely poled transistors are likewise driven by the manipulative variable X. These transistors operate as compensators and in turn drive, for example, two light emitting diodes in the display. The display is activated as soon as the electro-static capacitance of the transducer under test together with coupling cable leads outside of defined range, since tuning and thus measurement can only be executed in an inadequate manner in this case.

While certain preferred embodiments have been described, there are modifications which may be apparent to those skilled in the art but which face within the scope and spirit of the invention. It is intended that such modifications be covered as well by the attached claims.

We claim:

1. A measuring method for identification of oscillatory properties of a piezo-electric transducer comprising the steps of:
   generating an electrical input signal having a variably selectable frequency;
   generating a reference output signal from said input signal;
   generating two sub-signals having a same frequency from said input signal, one of said sub-signals being independent of electro-mechanical properties of said transducer, the other of said sub-signals being dependent upon electro-mechanical properties of said transducer;
   generating a difference output signal from said sub-signals;
   measuring said difference output signal relative to said reference signal;
   tuning said sub-signals constantly during operation to a deviation of zero;
   generating a rated value for said difference output signal;
   generating an actual value for a portion of said difference signal lying in phase or 180° out of phase with said reference output signal;
   tuning said sub-signals with a rated value-actual value differential control of that part of the difference output signal lying in phase or alternatively, 180° out of phase with said reference output signal; and
   using a remaining part of said difference output phase-shifted essentially by 90° relative to said reference output signal as a measure for a resonance characteristic of said transducer.

2. A method as set forth in claim 1 further including the steps of:
   varying said sub-signals for tuning such that a sum of said sub-signals is constant;
   generating said reference output signal from one of said sub-signals;
   measuring an amplitude of said reference output signal;
   measuring an amplitude of said input signal;
   using a ratio of said measurements of said amplitudes to define a tuning relationship between said sub-signals;
   using a ratio of said measurements of said amplitudes for numerical evaluation of a test result.

3. A method as set forth in claim 1 including the step of measuring the remaining part of said difference output signal which is phase-shifted 90° relative to said reference output signal.

4. A method as set forth in claim 3, wherein measuring of said remaining part of said difference output signal is undertaken narrow-and at the frequency of said input signal.

5. A method for operating a piezo-electric transducer at one of its resonant frequencies comprising the steps of:
   supplying said transducer with an electrical drive signal having a selectable frequency;
   generating a reference output signal from said drive signal;
   generating two sub-signals from said drive signal, said sub-signals having the same frequency, one of said sub-signals being dependent upon electromechanical properties of said transducer, the other sub-signal being independent of the electromechanical properties of said transducer;
   generating a difference output from said sub-signals by subjecting said sub-signals to a difference or summing function
   measuring said difference output signal relative to said reference output signal;
   generating a rated value for said difference output signal;
   generating an actual value for a portion of said difference signal lying in phase or 180° out of phase With said reference output signal;
   tuning said sub-signals during operation constantly to a deviation of zero with a ratedvalue-actual value differential control of that part of the difference output signal lying in phase or 180° out of phase with the reference output signals;
   identifying a remaining part of said difference output signal; and
   controlling the frequency of said drive signal to maximize said difference output signal.

6. An apparatus for identification of oscillatory properties of a piezo-electric transducer, comprising:
   a signal generator which generates an electrical input signal having a variably selectable frequency;
   a tuning unit coupled to said signal generator which receives said input signal and which generates two sub-signals of the same frequency from said input signal, one of said sub-signals being independant of electro-mechanical properties of said transducer;
   the other of said sub-signals being dependent upon electro-mechanical properties of said transducer;
   a difference function unit coupled to said tuning unit which generates a difference output signal from said two sub-signals;
   a reference unit coupled to said signal generator which generates a reference output signal from said input signal;
   an evaluation unit coupled to said difference function unit and said reference for receiving said reference output signal and said difference output signal; and
   an automatic control unit coupled to said tuning unit which supplies a manipulated variable signal to said tuning unit in response to effecting a comparison of an actual value of that part of the difference output signal lying in phase or 180° out of phase with the reference output signal and a rated value.

7. An apparatus as set forth in claim 6 further including a phase meter for supplying said actual value coupled to said difference function unit to receive said difference output signal.

8. An apparatus as set forth in claim 7, wherein said phase meter comprises a synchronous demodulator.

9. An apparatus as set forth in claim 8, wherein said control unit comprises an integral controller.

10. An apparatus as set forth in claim 9, wherein said integral controller includes means for effecting a differential response to an electrical signal and means for effecting a proportional response to an electrical signal.

11. An apparatus as set forth in claim 6, wherein said tuning unit comprises a capacitative diode coupled to the control unit as an actual tuning element,
   said diode having a variable capacitance which is selected by said manipulated variable signal.

12. An apparatus as set forth in claim 6, wherein said tuning unit comprises a field effect transistor coupled to the control unit as an actual tuning element, a drain to source resistance of said field effect transistor being variable and selectable by said manipulated variable signal.

13. An apparatus as set forth in claim 6, wherein said tuning unit comprises a slope amplifier coupled to the control unit as an actual tuning element, the gain of said slope amplifier being varied by said manipulated variable signal.

14. An apparatus as set forth in claim 6 wherein said tuning unit includes an actual tuning element comprising a first differential amplifier having two emitter coupled transistors coupled to said control unit and two emitter-coupled transistors, whereby said manipulated variable signal effects a division ratio of a current signal generated from said input signal into emitted currents of the two transistors of the first differential amplifier, said emitter currents corresponding to said two sub-signals.

15. An apparatus as set forth in claim 14, including a logarithmization unit for changing said manipulated variable signal, said logarithmization unit being coupled between the control unit and the tuning unit.

16. An apparatus as set forth in claim 14, including a second differential amplifier comprising two emitter coupled transistors, said second differential amplifier being coupled in parallel to said first differential amplifier within said tuning unit, said second differential amplifier effecting a current division function, whereby a constant current corresponding to a mean quiescent current of a current signal generated from said input signal is divided into two sub-currents at a ratio equal to said division in said first differential amplifier, each of said sub-currents being additively combined with one of said sub-currents of said first differential amplifier to form two resulting sub-currents, so that mean quiescent currents of said two resulting sub-currents are essentially independent of a change in the ratio of current division caused by the control unit.

17. An apparatus as set forth in claim 6 wherein the difference output signal and the reference output signal are followed by frequency band pass filters which are tuned to each other.

* * * * *